United States Patent
Honzawa et al.

(10) Patent No.: US 8,134,804 B2
(45) Date of Patent: Mar. 13, 2012

(54) MICRO ELECTRO MECHANICAL SYSTEM AND HEAD GIMBAL ASSEMBLY

(75) Inventors: Tadashi Honzawa, Kanagawa (JP); Yousuke Fukumoto, Kanagawa (JP); Kenji Itoh, Kanagawa (JP); Shinobu Hagiya, Kanagawa (JP); Haruhide Takahashi, Kanagawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 440 days.

(21) Appl. No.: 12/384,231

(22) Filed: Apr. 1, 2009

(65) Prior Publication Data
US 2009/0251825 A1  Oct. 8, 2009

(30) Foreign Application Priority Data
Apr. 1, 2008  (JP) ................................ 2008-095586

(51) Int. Cl.
*G11B 5/48* (2006.01)
*G11B 21/46* (2006.01)
(52) U.S. Cl. .................................................. 360/245.3
(58) Field of Classification Search ................ 360/245.3
See application file for complete search history.

(56) References Cited

U.S. PATENT DOCUMENTS

| | | | |
|---|---|---|---|
| 6,459,260 B1 * | 10/2002 | Bonin et al. | 324/750.25 |
| 2006/0044699 A1 * | 3/2006 | Hirano et al. | 360/294.4 |
| 2007/0059983 A1 * | 3/2007 | Anzai et al. | 439/630 |

* cited by examiner

*Primary Examiner* — Hoai V Ho
*Assistant Examiner* — Min Huang
(74) *Attorney, Agent, or Firm* — Brokaw Patent Law PC; Christopher J. Brokaw (57) ABSTRACT

Embodiments of the present invention help to prevent dropout of a head slider from an micro electrical mechanical system (MEMS) and damage of the MEMS. In an embodiment of the present invention, a suspension for a slider dynamic electric test (DET) comprises an MEMS for supporting a head slider. The MEMS has a clamper for holding a head slider and the clamper moved by an external force can attach or detach a head slider. The suspension comprises limiters for limiting the clamper's lateral movement. The limiters limit the clamper's undesirable movement, which prevents the clamper's lateral movement in attaching a head slider, a head slider's dropout and the MEMS's damage caused by a contact with a magnetic disk, or a head slider's dropout and the MEMS's damage in handling.

20 Claims, 10 Drawing Sheets

MICRO ELECTRO MECHANICAL SYSTEM AND HEAD GIMBAL ASSEMBLY

CROSS-REFERENCE TO RELATED APPLICATION

The instant nonprovisional patent application claims priority to Japanese Patent Application No. 2008-095586 filed Apr. 1, 2008, and which is incorporated by reference in its entirety herein for all purposes.

BACKGROUND OF THE INVENTION

Disk drive devices using various kinds of media, such as optical disks, magneto-optical disks, and flexible magnetic disks, have been known in the art. In particular, hard disk drives (HDDs) have been widely used as storage devices of computers, and have been one of indispensable storage devices for current computer systems. Moreover, HDDs have found widespread application to moving image recording/reproducing apparatuses, car navigation systems, and cellular phones in addition to the computers, due to their outstanding characteristics.

An HDD comprises a magnetic disk for storing data and a head slider for accessing the magnetic disk. The head slider comprises a head element portion for reading data from and/or writing data to the magnetic disk and a slider on which the head element portion is formed. The head element portion comprises a recording element for converting electric signals into a magnetic field according to data to be recorded to the magnetic disk, and a reproducing element for converting magnetic field from the magnetic disk into electric signals.

The HDD further comprises an actuator for moving the head slider to a desired position above the magnetic disk. The actuator is driven by a voice coil motor (VCM) and rotates on a rotational shaft to move the head slider along the radial direction over the spinning magnetic disk, which allows the head element portion to access a desired track formed on the magnetic disk to read or write data.

The actuator comprises a suspension having elasticity and the head slider is secured to the suspension with an adhesive. Pressure caused by the air viscosity between an air bearing surface (ABS) of the head slider facing the magnetic disk and a spinning magnetic disk balances the pressure toward the magnetic disk applied by the suspension, so that the head flies over the magnetic disk with a specific gap.

In manufacturing HDDs, a test called a slider Dynamic Electric Test (slider DET) is conducted. A typical slider DET sets a head gimbal assembly (HGA), which is an assembly of a head slider and a suspension, to a test apparatus and performs actual read/write operations from/to a spinning magnetic disk. Thereby, the test evaluates the head slider's flying characteristic and recording and reproducing characteristics.

The HGAs satisfying the specification in the slider DET proceed to the next manufacturing step and the HGAs determined to be failed are discarded. Accordingly, when a head slider does not satisfy the specification, the suspension with the head slider bonded is discarded together, which has been a loss in manufacturing HGAs.

To eliminate this loss of suspensions in manufacturing HGAs, slider DET apparatuses in which head sliders are attachable and detachable have been proposed (refer to Japanese Patent Publication No. 2004-531014 "Patent Document 1", for example). The slider DET apparatus has a suspension for the slider DET and the suspension has a socket for a head slider to be attached to/detached from. The socket is bonded to the gimbal of the suspension. In this way, the slider DET apparatus for a head slider singly achieves a test on the head slider prior to being mounted on a suspension of a product to eliminate the suspension loss because of a defect head slider.

The socket disclosed in the Patent Document 1 comprises an opening for placing a head slider therein and a clamp bar for pressing the head slider against signal terminals in the opening to hold the head slider. To generate clamping force by the clamp bar, beam springs are formed at the front and the rear (the leading side and the trailing side) of the opening (head slider).

The socket is a micro electro mechanical system (MEMS); a metal layer for signal transmission is formed by plating a silicon substrate shaped by etching. Although the mechanism for attaching/detaching head sliders may be formed directly on the gimbal, the socket of the MEMS attached to the gimbal can extend the life of the suspension used in the slider DET and can improve the stabilities of the suspension and the slider DET.

To conduct the slider DET accurately, it is important that the slider be positioned properly on the suspension (in the socket) and receive a load (clamping force) in a proper direction. To this end, when securing the head slider to the socket, it is important to move the clamper straight in the front-rear direction and not to move it in the left-right direction (radial direction when it is above the magnetic disk)

When the clamper of the MEMS hits the magnetic disk because of vibration of the HGA in the slider DET, the clamper may receive a force in the lateral direction. In such an occasion, if the clamper considerably displaces in the lateral direction, the head slider may be released from the socket or the MEMS may be broken. The same thing may happen when the clamper receives a shock in the lateral direction in handling the MEMS or the HGA.

BRIEF SUMMARY OF THE INVENTION

Embodiments of the present invention help to prevent dropout of a head slider. from a MEMS and damage of the MEMS. According to the embodiment of FIGS. 3(a) and 3(b), a suspension for a slider DET comprises an MEMS 15 for supporting a head slider. The MEMS has a clamper 51 for holding a head slider and the clamper moved by an external force can attach or detach a head slider. The suspension comprises limiters 56a and 56b for limiting the clamper's lateral movement. The limiters limit the clamper's undesirable movement, which prevents the clamper's lateral movement in attaching a head slider, a head slider's dropout and the MEMS's damage caused by a contact with a magnetic disk, or a head slider's dropout and the MEMS's damage in handling.

DETAILED DESCRIPTION OF THE INVENTION

Embodiments of the present invention relate to a micro electro mechanical system (MEMS) to which a head slider is attached detachably and a head gimbal assembly.

An aspect of embodiments of the present invention is a micro electro mechanical system to which a head slider is detachably attached; the micro electro mechanical system comprises a connection terminal for contacting a connection pad of the head slider, a clamper for pressing the head slider toward the connection terminal, a clamp spring for connecting the clamper to generate a clamping force, and a limiter for contacting the clamper to limit movement of the clamper in both directions vertical to the clamping force in plane. This improves reliability of holding the head slider.

Embodiments of the present invention are particularly useful to the micro electro mechanical system comprising two clamp springs, which are arranged in the direction vertical to the clamping force in plane so as to sandwich the head slider.

The limiter may further limit the movement of the clamper toward the connection terminal. This prevents the clamper's breakage. In one example, the limiter extends from the connection terminal side toward the clamper, a part of the tip of the limiter is positioned in a recess formed in the clamper, and the part of the tip contact an inner wall of the recess to limit the movement of the clamper. This achieves effective limitation of the clamper's movement in a simple structure.

In another example, the micro electro mechanical system comprises two limiters; each of the two limiters extends toward the clamper between each of the two clamp springs and the head slider, a part of the tip of each of the two limiters is positioned in a recess formed in the clamper, and the part of the tip contacts an inner wall of the recess to limit the movement of the clamper. This achieves effective limitation of the clamper's movement in a simple structure.

The micro electro mechanical system may comprise a plurality of connection terminals for contacting connection pads of the head slider, a part of the plurality of connection terminals function as stoppers for holding the head slider between the part of the plurality of connection terminals and the clamper, and the other connection terminals of the plurality of connection terminals have smaller spring constants in the clamping force direction than the connection terminals functioning as stoppers. This achieves a more secure hold of the head slider and improves the reliability of contact between the connection terminals and the connection pads.

The clamper may comprise a projection for contacting and pressing the head slider and the projection be positioned between two connection terminals functioning as the stoppers in the direction where the plurality of connection terminals are arranged. This achieves a more secure hold of the head slider.

The connection terminal may have elasticity in the clamping force direction and elasticity in the vertical directions, and the spring constants in the vertical directions be smaller than the spring constant in the clamping force direction. This suppresses the deterioration of the connection terminals. The contact position of the clamper to the head slider may be farther from an air bearing surface of the head slider than the contact position of the connection terminal to the head slider. This achieves a more secure hold of the head slider.

Another aspect of embodiments of the present invention is a head gimbal assembly comprising a suspension and a head slider held by the suspension; the suspension comprises a gimbal, a micro electro mechanical system secured to the gimbal, to which a head slider is attached detachably, comprising a connection terminal for contacting a connection pad of the head slider, a clamper for pressing the head slider toward the connection terminal, and a clamp spring for connecting the clamper to generate a clamping force, and a limiter for contacting the clamper to limit movement of the clamper in both directions vertical to the clamping force in plane. This improves reliability of holding the head slider.

The limiter may be formed in the micro electro mechanical system. This effectively prevents the clamper's breakage if the micro electro mechanical system is present singly. Alternatively, the limiter may be formed in the gimbal. Thereby, the clamper's movement can be effectively limited in attaching a head slider.

The limiter may be formed on the micro electro mechanical system and may comprise a first limiter formed in the micro electro mechanical system for limiting movement of the clamper in the both directions vertical to the clamping force in plane, and a second limiter formed in the gimbal for limiting movement of the clamper in the both directions vertical to the clamping force in plane. This achieves effective limitation of the clamper's movement regardless of the clamper's state.

In one example, the limiter protrudes from a gimbal tongue to which the micro electro mechanical system is secured. This reduces the possibility that the limiter hit the clamper because of the gimbal's deformation. Alternatively, the limiter protrudes from a body of the gimbal distant from a gimbal tongue to which the micro electro mechanical system is secured. This achieves an arrangement of the limiter to affect the design of suspension a little. Alternatively, the limiters for limiting the movement of the clamper are provided on the both sides of the clamper in the directions vertical to the clamping force. Thereby, the required size accuracy in processing and assembling can be reduced.

Yet another aspect of embodiments of the present invention is a head gimbal assembly comprising a suspension and a head slider held by the suspension; the suspension comprises a plurality of connection terminals for contacting a plurality of connection pads of the head slider, a clamper for pressing the head slider toward the connection terminals and a clamp spring for connecting the clamper to generate a clamping force. A part of the plurality of connection terminals function as stoppers for holding the head slider between the part of the plurality of connection terminals and the clamper, and the other connection terminals of the plurality of connection terminals have smaller spring constants in the clamping force direction than the connection terminals functioning as stoppers. This achieves securer hold of the head slider and improves the reliability of contact between the connection terminals and the connection pads.

Embodiments of the present invention can improve the reliability of holding head sliders in a test on the head sliders.

Hereinafter, particular embodiments of the present invention will be described. Throughout the drawings, like components are denoted by like reference numerals, and their repetitive description is omitted if not necessary for clarity of explanation. In the embodiments, descriptions are given to a hard disk drive (HDD) as an example of a disk drive device. The embodiments have a feature in a suspension used in a dynamic electric test (DET) on head sliders.

The head sliders in which the slider DET found defects are discarded. Head sliders are attachable detachably to the suspension of the embodiments. Therefore, even when the slider DET has found a defect in a head slider, the suspension needs not to be discarded together with the head slider. This prevents wasting of suspensions because of the defects in head sliders and can improve the manufacturing yield of HGAs.

A head slider which has passed the slider DET is detached from the suspension, mounted on a product suspension and then mounted on an HDD. In the present specification, the assembly of a suspension and a head slider is called a head gimbal assembly (HGA). The HGA includes an assembly of a suspension and a head slider in the slider DET in addition to a device to be mounted on an HDD.

The suspension for the slider DET of one embodiment has a micro electro mechanical system (MEMS) for holding a head slider. The MEMS is a device in which mechanical elements and electronic elements are arranged on a silicon substrate and has a movable structure formed by etching the silicon substrate.

The MEMS of one embodiment has a clamper for holding a head slider; the clamper moved by an external force allows a head slider to be attached and detached. The MEMS or the suspension of the present embodiment has a limiter to limit movement in the in-plane lateral direction of the clamper (the direction parallel to the air bearing surface (ABS) of a head slider and vertical to the direction of the clamping force of the clamper).

This limiter limits undesirable movement of the clamper to prevent the clamper's movement in the lateral direction at attachment of a head slider, the head slider's dropout or the MEMS's breakage caused by a contact to a magnetic disk, and the head slider's dropout or the MEMS's breakage in handling.

As described above, a head slider is subjected to the slider DET before getting mounted on an HDD in the manufacturing step. The slider DET forms an HGA by mounting a head slider on a suspension for the slider DET, sets the HGA to the slider DET apparatus, and performs actual read/write operations from/to a spinning magnetic disk to evaluate the head slider's flying characteristic and recording an reproducing characteristics.

Figure 1:
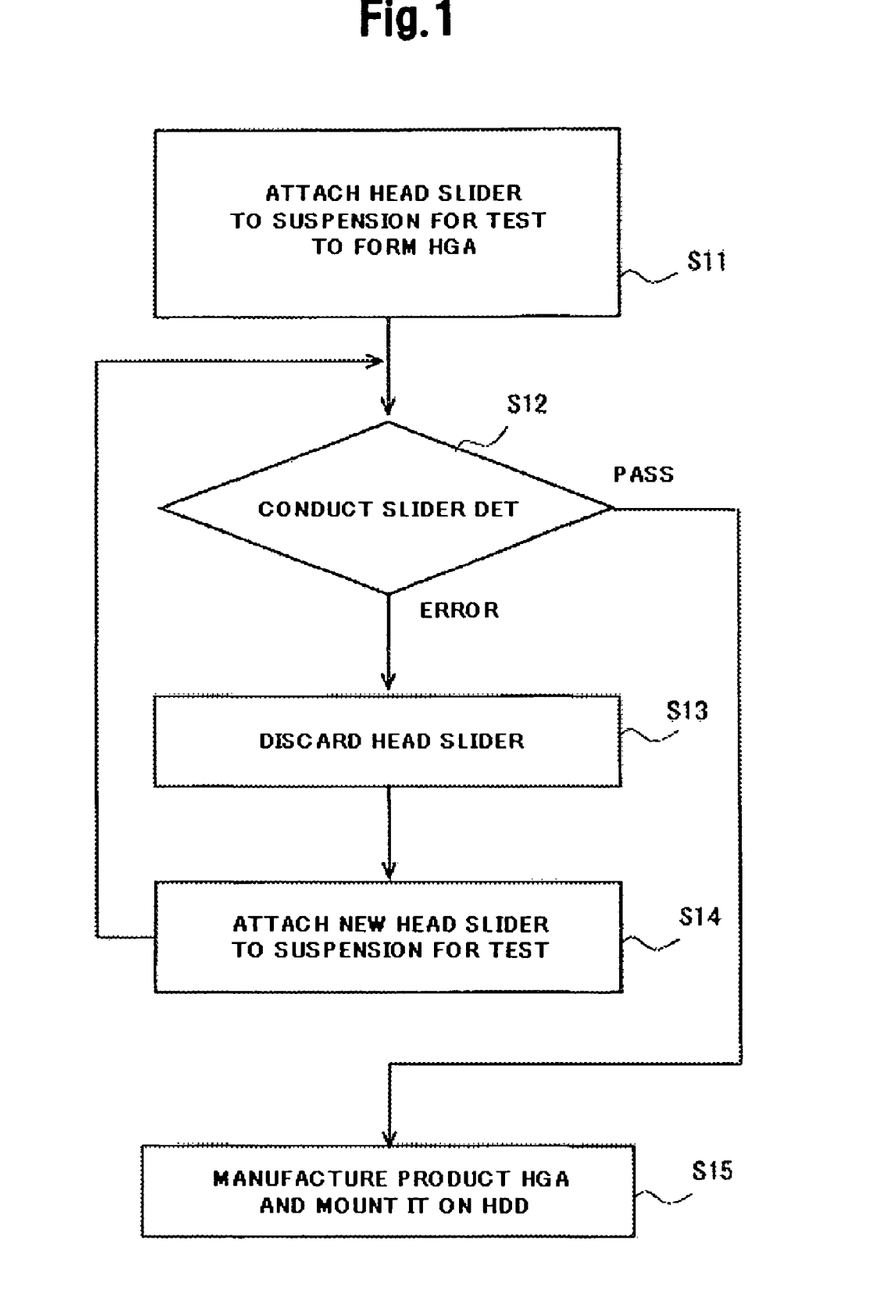
FIG. 1 is a flowchart illustrating manufacturing steps of HGAs and HDDs including a slider DET in an embodiment.

Specifically, as seen from the flowchart of FIG. 1, first a head slider is attached to a prepared suspension for the slider DET to form an HGA (S11). The formed HGA is set to a slider DET apparatus to undergo the slider DET (S12). If the evaluation result in the DET in S12 is 'error', the head slider is removed from the suspension and discarded (S13). Another new head slider is attached to a suspension (S14) and subjected to the slider DET again (S12).

If the evaluation result in the slider DET in S12 is 'passed', the head slider is removed from the suspension and bonded to a product suspension to manufacture an HGA as a product, and the product HGA is mounted in an HDD (S15). The suspension for the DET is successively used in the DET on another head slider. The product HGA is assembled with an arm and a VCM coil to form a head stack assembly (HSA) with them. Components such as the HSA, a magnetic disk, and a spindle motor are mounted on a base and a top cover is secured so as to cover the opening of the base. Then, a control circuit board is mounted to finish an HDD.

Figure 2:
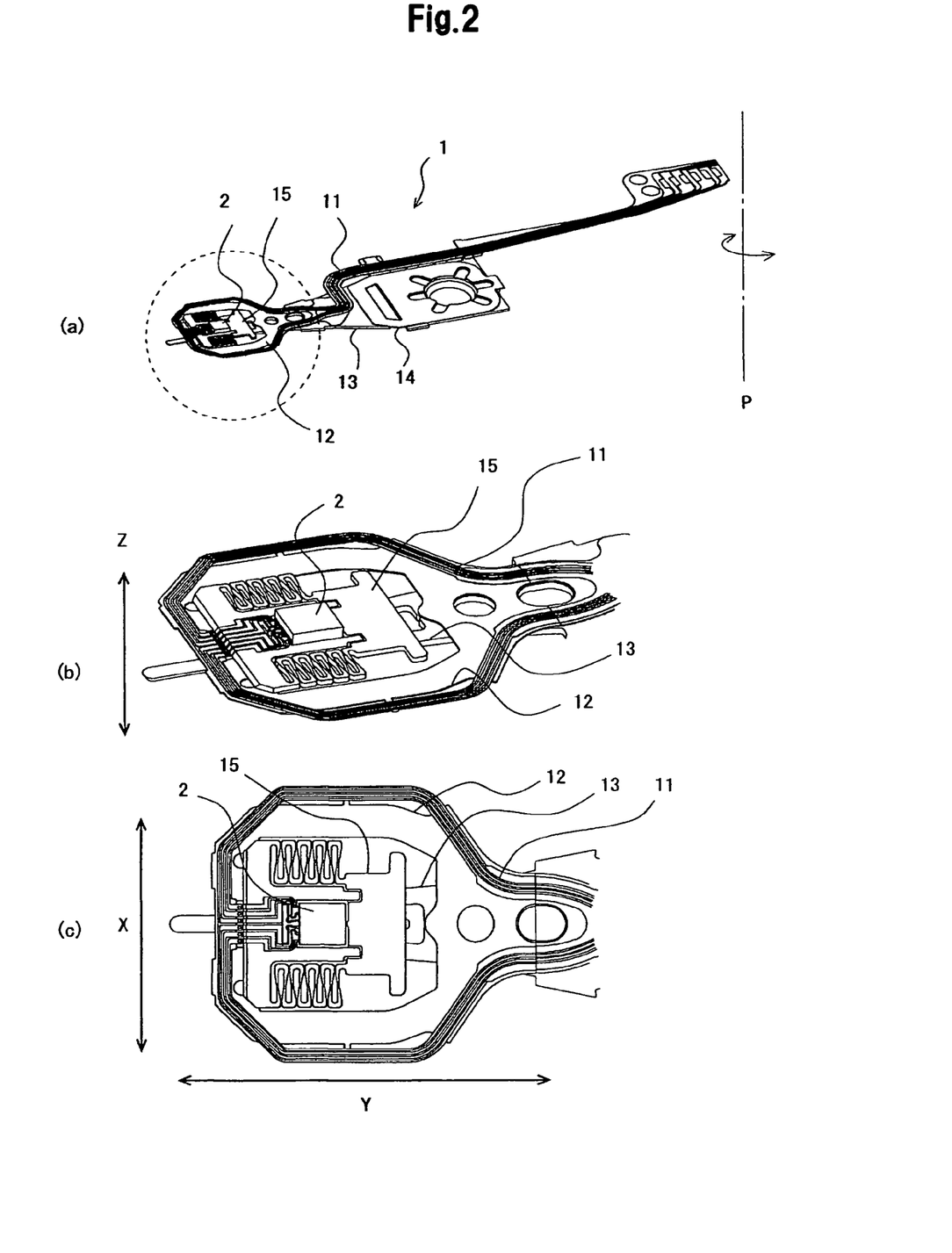
FIGS. 2(a)-2(c) are drawings schematically showing the entire configuration of an HGA in the slider DET in an embodiment.

Hereinafter, a suspension used in the slider DET of one embodiment will be described in detail. FIG. 2(a) is a perspective view depicting an entire HGA formed by a suspension 1 for the slider DET and a slider 2 attached to the suspension 1. FIGS. 2(b) and 2(c) are an enlarged perspective view and an enlarged plan view of the part surrounded by the circle in FIG. 2(a), respectively. FIGS. 2(a) to (c) show the HGA's surface facing the magnetic disk.

The suspension 1 comprises a trace 11, a gimbal 12 (also called a flexure), a load beam 13, a base plate 14, and an MEMS 15. The trace 11 transmits signals of the elements on the head slider 2. The number of leads of the trace 11 changes depending on the configuration of the head slider 2; the trace 11 in the shown example has six leads. One end of each lead is connected to an internal circuit such as a head amplifier (not shown) and the other end of each lead is connected to a connection pad of the MEMS 15. The leads and the connection pads of the MEMS 15 are typically interconnected electrically and physically with solder balls or gold balls.

The load beam 13 is made of stainless steel, for example, and functions as a precision flat spring. The load beam 13 extending lengthwise vertically to the rotational direction in its shape is thin and light, and has a necessary stiffness (larger than the gimbal 12). The elasticity of the load beam 13 generates a load to counteract the flying force of the head slider 2. This load balances the pressure (flying force) caused by the air viscosity between the ABS of the head slider 2 and the spinning magnetic disk so that the head slider 2 flies at a desired height.

The gimbal 12 is secured to the surface of the load beam 13 facing the magnetic disk by laser spot welding, for example. The gimbal 12 is made-of stainless steel, for example. The gimbal 12 has desired elasticity and is formed deformable. In the front part of the gimbal 12, a tongue-like gimbal tongue (not shown in FIGS. 2(a) to 2(c)) is formed and the MEMS 15 is secured thereto. The MEMS 15 consists of a movable part and a stationary part; the stationary part is partially bonded to the gimbal tongue.

A gimbal tongue can tilt the MEMS 15 and the head slider 2 held thereon in the pitch direction or the roll direction and develops high tracking performance in tracking to a magnetic disk. The other part of the suspension 1 except for the MEMS 15 may be designed in the same manner as the suspension to be mounted on an HDD or may be designed for exclusive use in the slider DET.

In one embodiment, the direction connecting the head slider 2 and the base plate 14 is defined as the front-rear direction (Y in FIG. 2(c)); the direction parallel to the ABS of the head slider and perpendicular to the front-rear direction, as the left-right direction (X in FIG. 2(c)); and the direction perpendicular to the X and the Y directions, as Z (Z in FIG. 2(b)). While the head slider 2 is flying above the magnetic disk, the circumferential direction is the front-rear direction and the radial direction is the left-right direction. In other words, the swing direction of the HGA above the magnetic disk is the left-right direction and the direction connecting the swing axis (P in FIG. 2(a)) and the head slider 2 is the front-rear direction. These are the directions perpendicular to each other in the plane parallel to the main surface of the suspension 1 (the surface facing the magnetic disk). The head slider 2 is located in the front of the base plate 14 and the base plate 14 is located at the rear of the head slider 2. The direction connecting the head slider 2 and the magnetic disk is the Z direction.

Figure 3:
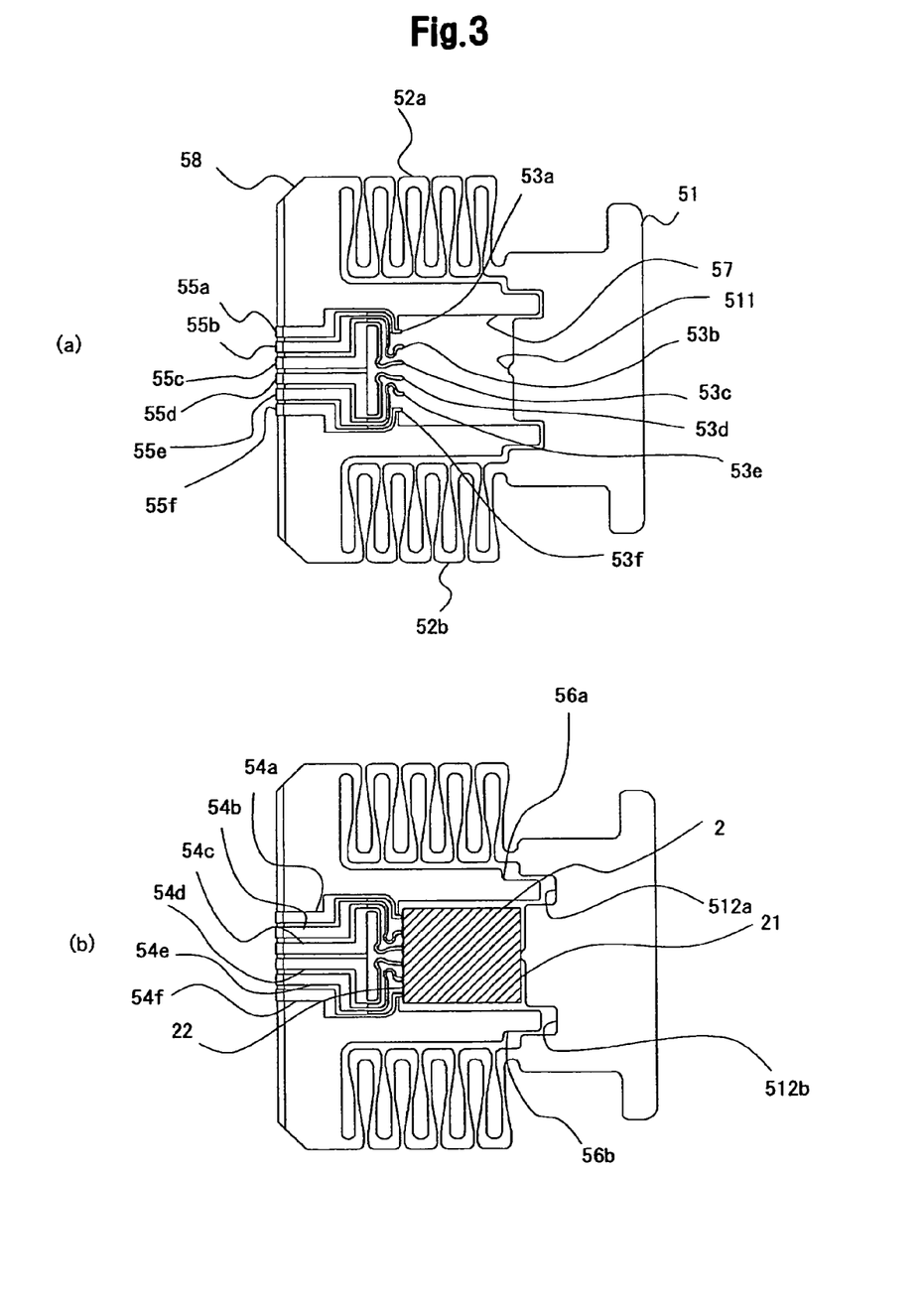
FIGS. 3(a) and 3(b) are plan views schematically showing the structure of MEMS in an embodiment.

The head slider 2 is held by the MEMS 15 on the suspension 1. FIG. 3(a) is a plan view illustrating the structure of the MEMS 15 and FIG. 3(b) is a plan view illustrating the MEMS 15 and the head slider 2 held by the MEMS 15. FIGS. 3(a) and 3(b) show the surface facing the magnetic disk. The MEMS 15 comprises a clamper 51, clamp springs 52a and 52b, connection terminals 53a to 53f, transmission lines 54a to 54f, connection pads 55a to 55f, limiter bars 56a and 56b, and a stationary main body 58. The head slider 2 is supported in an opening 57 of the MEMS 15. The stationary body 58 is bonded to the gimbal 12.

The MEMS 15 has a metal layer for signal transmission formed by plating a silicon substrate shaped by etching. The MEMS 15 can be manufactured through a semiconductor manufacturing technology. A head slider 2 is located in an opening 57 and sandwiched between connection terminals 53a to 53f and a clamper 51.

The clamper 51 is located behind the head slider 2 (the opening 57) and the connection terminals 53a to 53f are located in front of the head slider 2. The clamper 51 is connected to clamp springs 52a and 52b whose elasticity draw the clamper 51 toward the head slider 2. The spring constants of the clamp springs 52a and 52 are the same and the clamper 51 receives a balanced elasticity. Accordingly, the direction of the clamping force from the clamper 51 is the front-rear direction.

The clamper 51 contacts the leading end surface 21 (rear end surface) of the head slider 2 and presses the leading end surface 21. Specifically, the clamper 51 has a projection 511 on the front end surface facing the head slider 2 and this projection 511 contacts the leading end surface 21. On the trailing end surface 22 (front end surface) of the head slider 2, a plurality of connection pads (six connection pads in the example of the drawing) are formed and they are pressed against the connection terminals 53a to 53f.

In attaching a head slider 2, the clamper 51 is moved parallel rearward (in the direction away from the connection terminals 53a to 53f), the head slider 2 is placed within the extended opening 57, and the clamper 51 is moved parallel forward. Thereby, the head slider 2 is held by the clamper 51 and the connection terminals 53a to 53f within the opening 57. In detaching the head slider 2, the clamper 51 is moved parallel rearward with the head slider 2 under suction and remove the head slider 2 from the opening 57.

The connection terminals 53a to 53f are arranged discretely in the left-right direction and each of them contacts each connection pad of the head slider 2 to attain an electric connection. Further, they press the trailing end surface 22 of the head slider 2 to support the head slider 2 together with the clamper 51.

The transmission lines 54a to 54f connect the connection terminals 53a to 53f and the connection pads 55a to 55f, respectively. The connection pads 55a to 55f and the transmission lines 54a to 54f are formed on the stationary main body 58. As described above, the connection pads 55a to 55f are connected to the leads of the trace; signals of the head slider 2 such as read signals and write signals are transferred through the connection terminals 53a to 53f, the connection pads 55a to 55f, and the transmission lines 54a to 54f.

Figure 4:
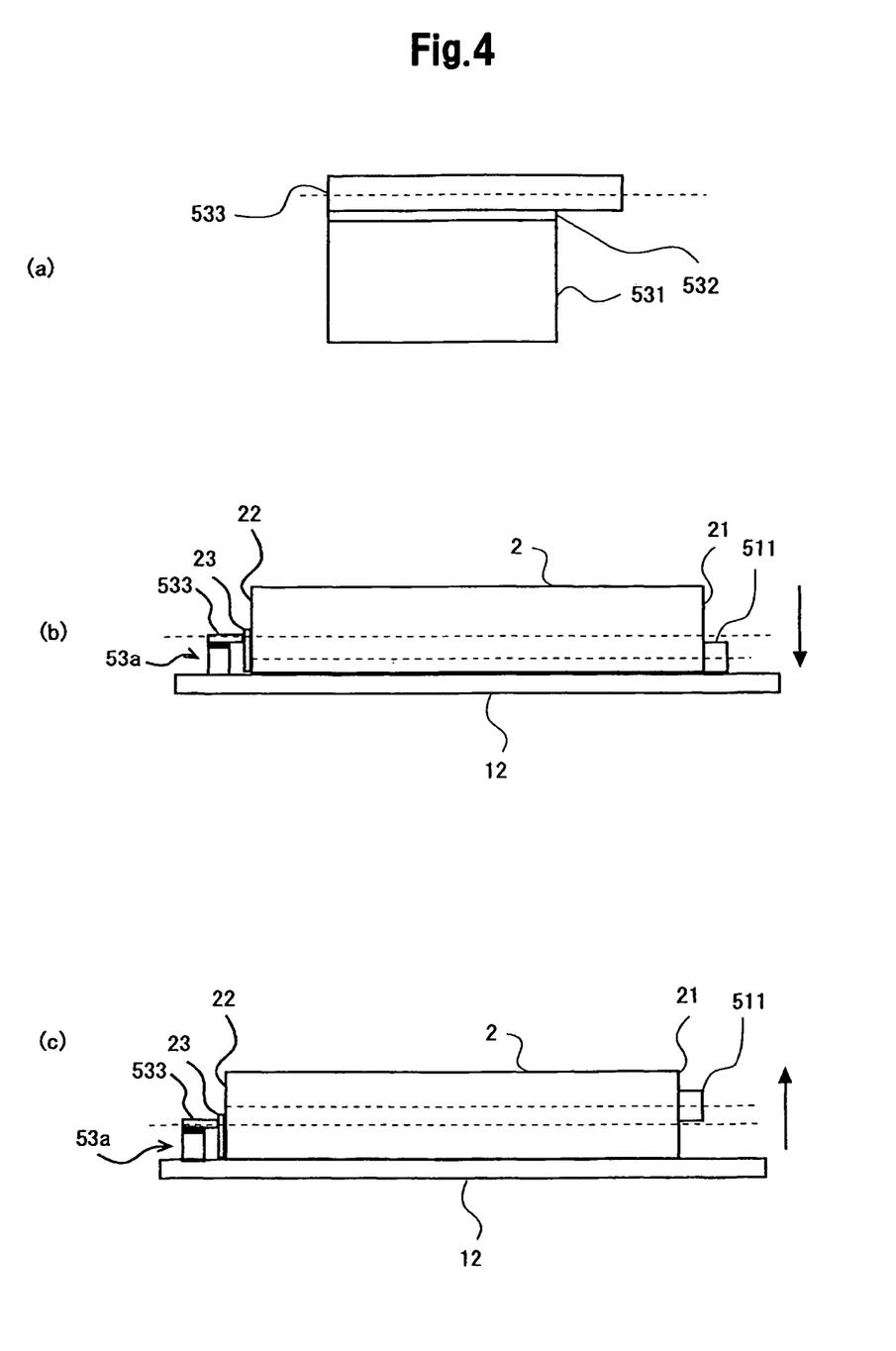
FIGS. 4(a)-4(c) are drawings schematically showing the structure of a connection terminal of the MEMS in an embodiment.

FIG. 4(a) is a side view schematically showing the structure of the tips on the head slier 2 side of the connection terminals 53a to 53f. Each of the connection terminals 53a to 53f comprises a silicon layer 531 of a base layer, an oxidized insulation layer 532 on the surface thereof, and a metal layer 533 formed on the oxidized insulation layer. The connection pads 55a to 55f and transmission lines 54a to 54f are the metal layer formed by plating on the oxidized insulation layer which is the surface layer of the silicon substrate.

As shown in FIG. 4(a), the metal layer 533 is protruding toward the head slider 2 (within the opening 57) more than the oxidized insulating layer 532 and the silicon layer 531. Accordingly, only the metal layer 533 contacts the connection pads of the head slider 2 and the oxidization insulation layer 532 and the silicon layer 531 are away from the connection pads. This achieves secure contact between the metal layer 533 and the connection pads and prevents interference in accurate signal transmission by the contact of the silicon layer 531 to the connection pads.

It is important that the connection terminals 53a to 53f securely contact the connection pads of the head slider 2. In the MEMS 15 of one embodiment, a part of the connection terminals contact the trailing end surface 22 of the head slider 2 to function as stoppers, and the other connection terminals have elasticity. Specifically, as shown in FIGS. 3(a) and 3(b), the connection terminals 53a and 53f at the both ends are stoppers and the connection terminals 53b to 53e between them have elasticity. It can be regarded that the connection terminals 53a and 53f at the both ends have a much greater spring constant than the other connection terminals 53b to 53e.

When the head slider 2 is not attached, the middle connection terminals 53b to 53e are protruding rearward more than the connection terminals 53a and 53f at the both side ends. In attaching the head slider 2, the middle connection terminals 53b to 53e pushed by the head slider 2 shrink and the head slider 2 is blocked by the connection terminals 53a and 53f at the both ends. On this occasion, the connection terminals 53a and 53f at the both ends deform little.

Accordingly, the clamping force for sandwiching the head slider 2 is applied between mainly the clamper 51 and the connection terminals 53a and 53f at the both ends. Such a configuration of the connection terminals 53a to 53f achieves secure contact between all the connection terminals 53a to 53f and the connection pads of the head slider 2.

To securely support the head slider 2 in a steady position, two connection terminals to function as stoppers may be provided and that the connection terminals at the both ends be the stoppers as described above. The middle connection terminals having elasticity (a small spring constant) typically have the same spring constant. Stoppers and the connection terminals may be formed independently but the connection terminals functioning as stoppers can achieve a simpler structure of the MEMS 15. The projection 511 may be positioned between the connection terminals functioning as stoppers in the X-direction, and particularly be positioned in the middle of the two connection terminals functioning as stopper. Thereby, the head slider 2 can be held securely.

In this connection, the spring constant of the middle connection terminals 53b to 53e may be smaller in the left-right direction than in the front-rear direction. In attaching the head slider 2, the connection terminals 53b to 53e may be pushed laterally. In this case, if the connection terminals 53b to 53e slide on the trailing end surface 22 (connection pads), the tip ends of the connection terminals 53b to 53e are worn out.

If the wear volume is large, the MEMS 15 needs to be replaced. Reducing the elasticity (spring constant) of the connection terminals 53b to 53e in the lateral direction allows the connection terminals 53b to 53e to be maintained bending in the lateral direction when the head slider 2 is held, which prevents the tip ends of the connection terminals 53b to 53e from getting worn out and improves the durability of the MEMS 15. On the other hand, increase in the elasticity (spring constant) in the front-rear direction achieves securer contact of the connection terminals 53b to 53e and can prevent the connection terminals 53b to 53e from sliding in the lateral direction. The connection terminals 53a and 53f at the both ends have higher stiffness (larger spring constant) in the lateral direction so that they substantially do not move.

FIG. 4(b) is a side view schematically depicting the head slider 2 sandwiched between the connection terminals 53a to 55f and the clamper 51. Among the connection terminals 53a to 53f, only the connection terminal 53a is shown in FIG. 4(b). The connection terminal 53a contacts the connection pad 23 on the trailing end surface 22 of the head slider 2. Also, the projection 511 of the clamper 51 contacts the leading end surface 21. As described above, the contact points of the connection pads 55a to 55f are the terminal 533 of the metal layer. The projection 511 of the clamper 51 is a part of the silicon layer 531.

As shown in FIG. 4(b), the contact position of the connection terminal 53a and the contact position of the projection 511 are different. In FIG. 4(b), the contact position of the connection terminal 53a is the terminal 533 of the metal layer as described above, and is located higher than the contact position of the projection 511. Namely, the connection terminal 53a contacts the head slider 2 at a position away from the gimbal 12 farther than the projection 511. While the HGA is flying above the magnetic disk, the contact position of the connection terminal 53a is closer to the magnetic disk than the contact position of the projection 511.

Specifically, as shown in FIG. 4(b), the contact position of the metal layer 533 is higher than the center of the contact surface of the projection 511. These two contact positions provided in this manner make it hard to remove the head slider 2 from the MEMS 15. The tips of the other connection terminals 53b to 53f have the same structure.

The clamper 51 is connected to the clamp springs 52a and 52b and is easy to move particularly in the up-down direction (the Z-axis direction or the swing axis direction) in response to vibration or impact. On the other hand, the spring constant of the connection terminals 53a to 53f in the up-down direction is larger than the one of the clamper 51, and particularly, there is little movement of the connection terminals 53a and 53f in the up-down direction. As exemplified in FIG. 4(c), when the projection 511 of the clamper 51 is higher than the connection terminals 53a to 53f, a torque to raise the clamper 51 side of the head slider 2 is applied so that normal clamping may not be achieved, or even if the clamping is possible, the force to peel a head slider away from a magnetic disk at the DET or the force to resist the force caused by an impact or vibration may be insufficient so that the head slider 2 may be removed easily from the MEMS 15.

On the other hand, in the MEMS 15 of the present embodiment shown in FIG. 4(b), the projection 511 of the clamper 51 is located lower (toward the gimbal 12) than the contact positions of the connection terminals 53a to 53f (metal layer 533). Therefore, a torque to move the clamper 51 side of the head slider 2 downward (toward the gimbal 12) is applied and a force pressing the head slider 2 toward the suspension 1 acts so that the head slider 2 is hard to be removed from the MEMS 15 by an impact or vibration and the head slider 2 can be held more securely.

Hereinafter, a limiter of the clamper 51 of the present embodiment will be described in detail. First, a limiter formed on the MEMS 15 will be described. As shown in FIGS. 3(a) and 3(b), the MEMS 15 comprises limiter bars 56a and 56b. The limiter bars 56a and 56b, which are limiters, extend from the stationary main body 58 toward the clamper 51 (rearward), define a part (the left and the right) of the opening 57 for housing a head slider 2, and are formed between the clamp springs 52a and 52b and the head slider 2. The positions and shapes of the limiter bars 56a and 56b are symmetrical with respect to the center line of the opening 57 extending in the front-rear direction and are arranged in the left-right direction with respect to the same.

The clamp springs 52a and 52b of one embodiment, which are a part of the movable part, are positioned on both of the left and the right sides of the head slider 2 and have recesses and protrusions arranged in the front-rear direction for generating elasticity. Thereby, the clamp springs 52a and 52b are easy to bend in the left-right direction (the top-bottom direction in FIGS. 3(a) and 3(b)). Similarly, since the clamper 51 of a part of the movable part is connected to the clamp springs 52a and 52b, it is easy to swing in the left-right direction.

Therefore, at attaching/detaching the head slider 2 or when vibration or an impact is applied to the MEMS 15 in the slider DET, the clamper 51 may move to release the head slider 2 or the clamp springs 52a and 52 may break. The limiter bars 56a and 56b limit this movement of the clamper 51 in the lateral direction.

The clamper 51 has recesses 512a and 512b on the front end and a part of the tips of the limiter bars 56a and 56b of the stationary parts are fitted in the recesses 512a and 512b. The limiter bars 56a and 56b are always fitted in the recesses 512a and 512b regardless of the presence or absence of the head slider 2 (whenever the head slider 2 has been attached or released).

When the clamper 51 moves, the limiter bars 56a and 56b contact the inner walls of the recesses 512a and 512b to limit the lateral movement of the clamper 51. Moreover, the limiter bars 56a and 56b limit the forward movement of the clamper 51. In handling the MEMS 15, the clamper 51 occasionally receives a considerable forward force (in the direction toward the connection terminals 53b to 53e). The clamp springs 52a and 52b are made of silicon; they are broken when they receive a considerable force. The limiter. bars 56a and 56b contact the inner walls of the recesses 512a and 512b to stop the clamper moving forward, which prevents the clamp springs 52a and 52b from receiving excessive loads.

The clamper 51 and the inner walls of the recesses 512a and 512b are usually distant with some gaps there between so that the limiter bars 56a and 56b do not interfere with the clamping operation of the clamper 51. To securely stop the movement of the clamper 51, it is important that the limiter bars 56a and 56b have sufficient stiffness. The limiter bars 56a and 56b may be partially bonded to the gimbal 12.

Figure 5:
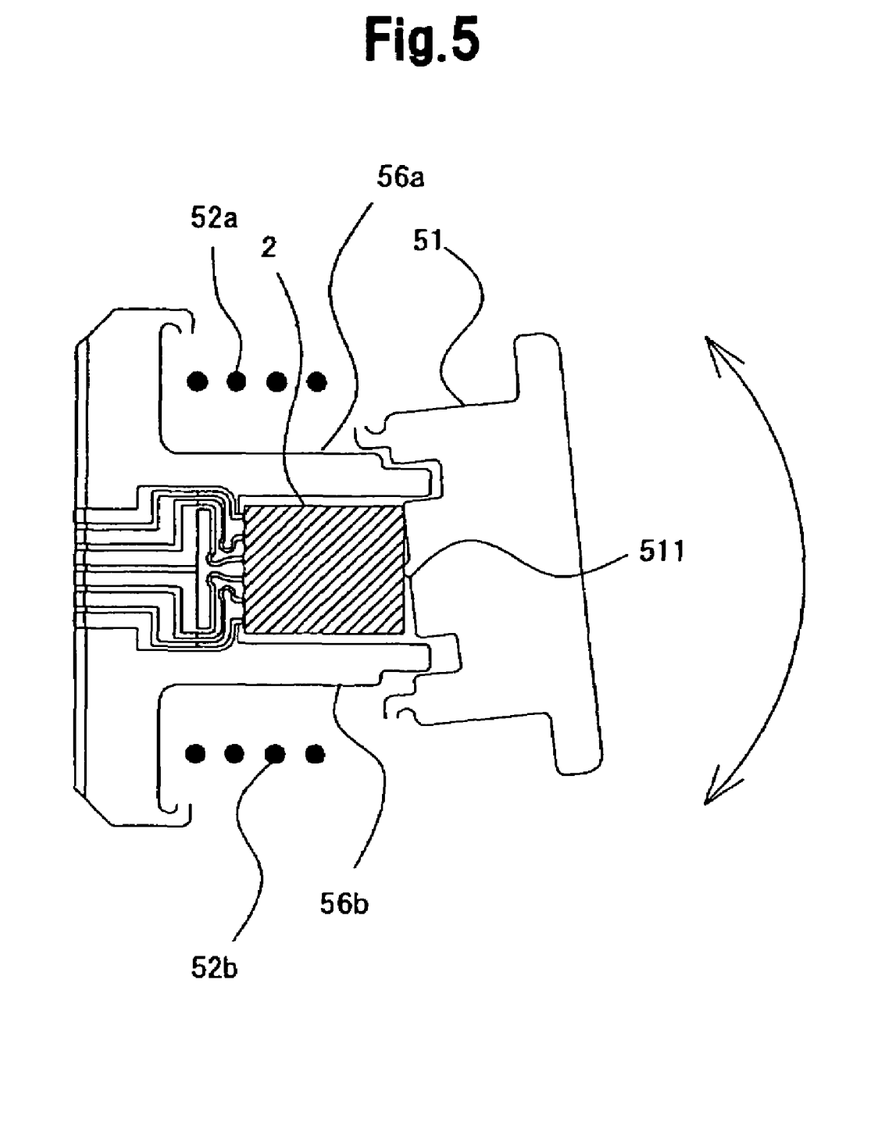
FIG. 5 is a drawing schematically showing a clamper rotating on a projection as a pivot in an embodiment.

In this way, the limiter bars 56a and 56b can suppress undesirable displacement of the clamper 51, but sometimes cannot sufficiently prevent the undesirable displacement of the clamper 51, particularly when the head slider 2 has been mounted. When the MEMS 15 receives vibration or an impact, the clamper 51 rotates (swings) on the projection 511 as a pivot as shown in FIG. 5. The limiter bars 56a and 56b may not necessarily exert sufficient effect in limiting such a movement of the clamper 51.

This movement may release the clamp from the head slider 2 or damage the MEMS 15. It is difficult for limiters formed on the MEMS 15 to sufficiently limit such a movement of the clamper 51 and it is possible to limit it with another limiter formed in the HGA 1.

Figure 6:
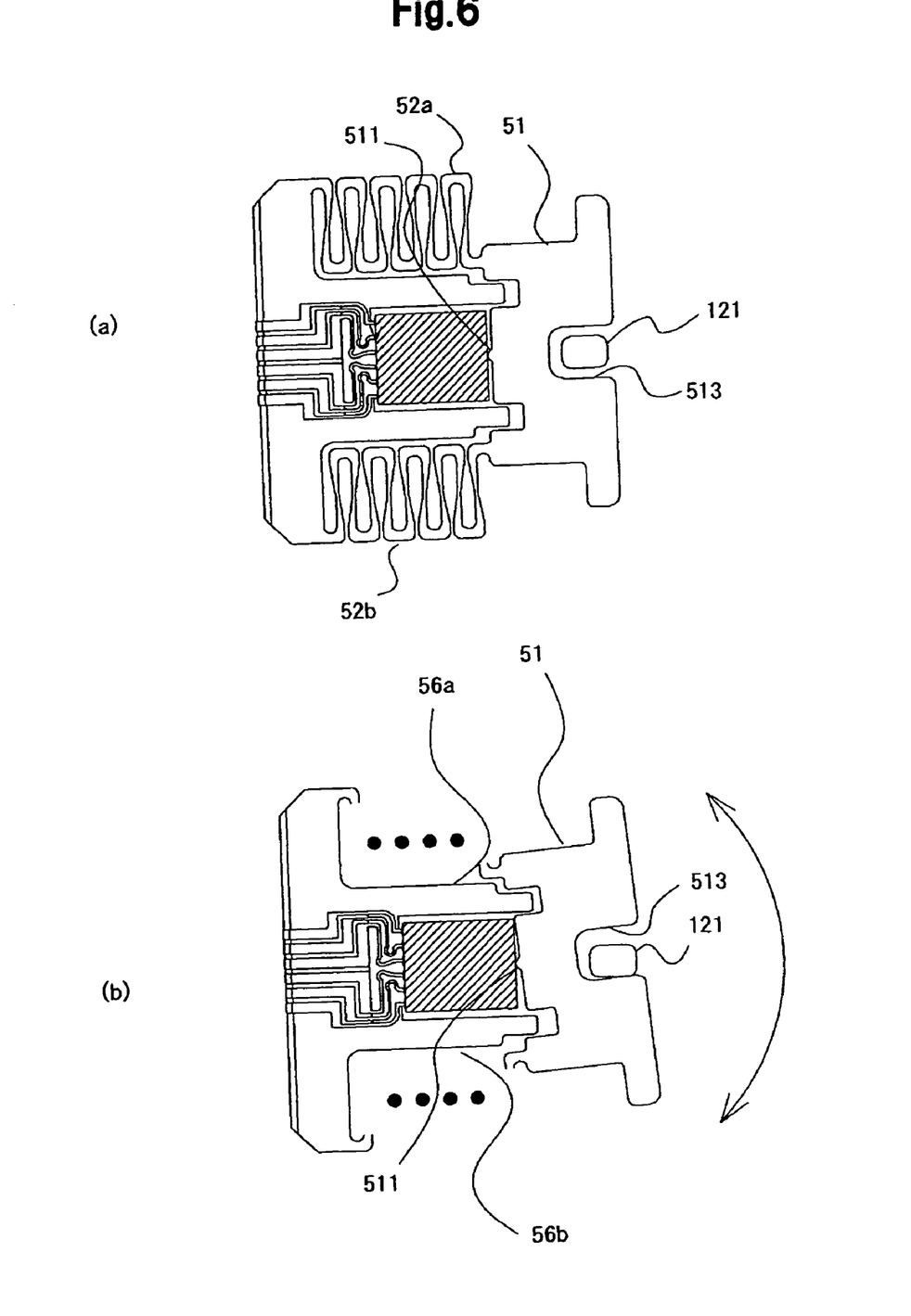
FIGS. 6(a) and 6(b) are drawings showing limiters for limiting the clamper rotating on a projection as a pivot in an embodiment.

FIGS. 6(a) and 6(b) show an example of such a limiter. A limiter 121 is formed on the gimbal 12 and is fitted in a recess 513 formed at the middle of the rear end of the clamper 51. When the clamper 51 rotates on the projection 511 as a pivot, the inner wall of the recess 513 contacts the limiter 121 so that the limiter 121 stops the movement of the clamper 51. In this way, a limiter 121 provided at a position distant from the projection 511 can effectively prevent a rotational displacement of the projection 511 of the clamper 51. Usually, the limiter 121 is distant from the inner wall of the recess 513, which does not interfere with clamping of the clamper 51.

Figure 7:
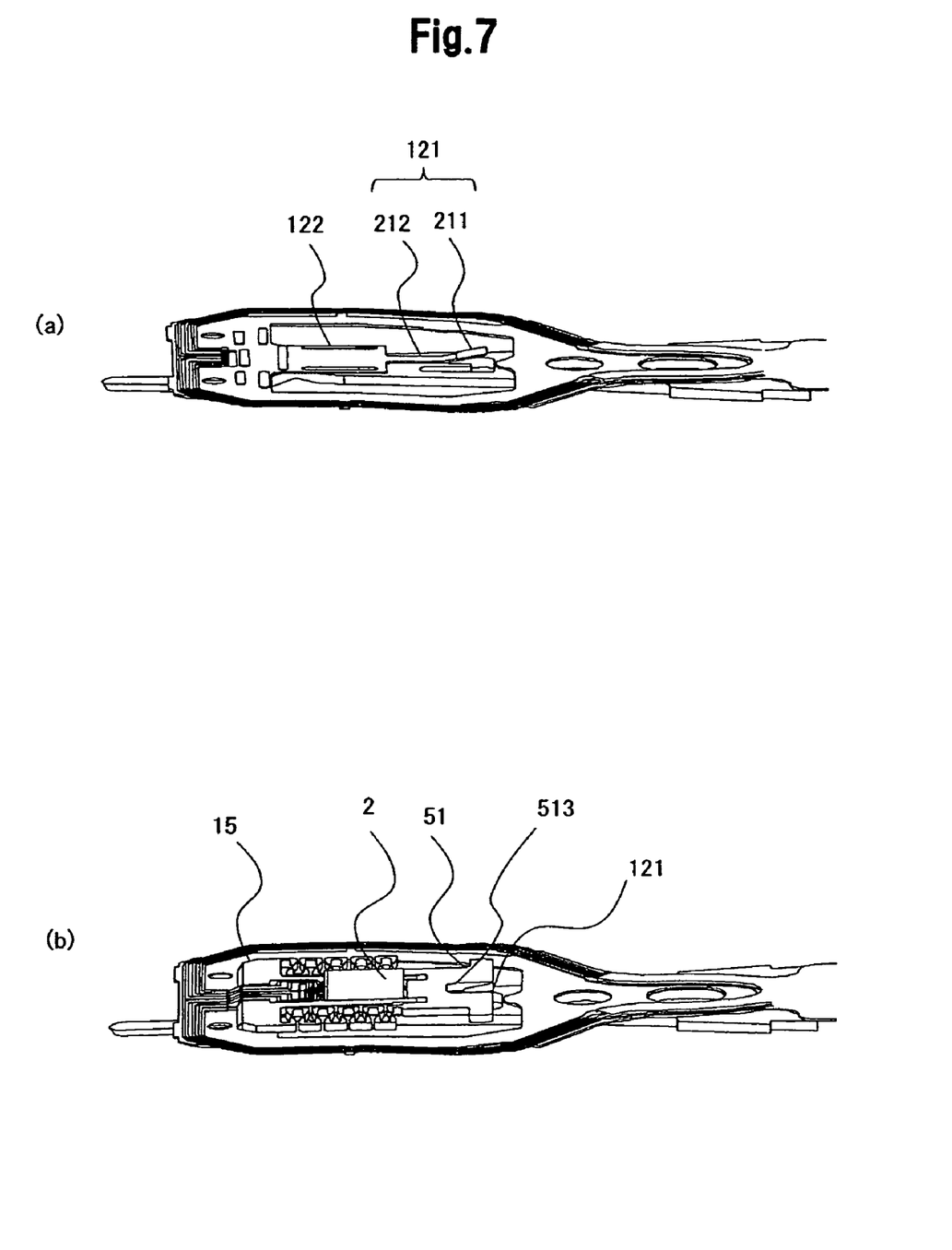
FIGS. 7(a) and 7(b) are drawings showing limiters for limiting the clamper rotating on a projection as a pivot in an embodiment.

As shown in FIGS. 7(*a*) and 7(*b*), the limiter 121 can be formed to extend from the gimbal tongue 122. FIG. 7(*a*) is a partial enlarged view of a suspension 1 without the MEMS 15 attached and the FIG. 7(*b*) is a partial enlarged view of an HGA. The limiter 121 extends rearward from the middle of the rear end of the gimbal tongue 122 and bends toward the MEMS 15 in the middle. The tip of the limiter 121 is positioned in the recess 513 of the clamper 51 to limit the rotation of the clamper 51.

The limiter 121 may have a soft resin member 211 made of polyimide, for example, at the tip, which suppresses the impact when the clamper 51 hits the limiter 121. Such a soft resin member can be easily formed on the limiter formed on the gimbal 12. In this regard, the main body 212 of the limiter 121 is integrated with the gimbal tongue 122 and they are made simultaneously.

Since the MEMS 15 and the gimbal tongue 122 move together, the limiter 121 formed on the gimbal tongue 122 advantageously suppresses occurrence of impact between the limiter 121 and the clamper 51 caused by the deformation of the gimbal 12.

Figure 8:
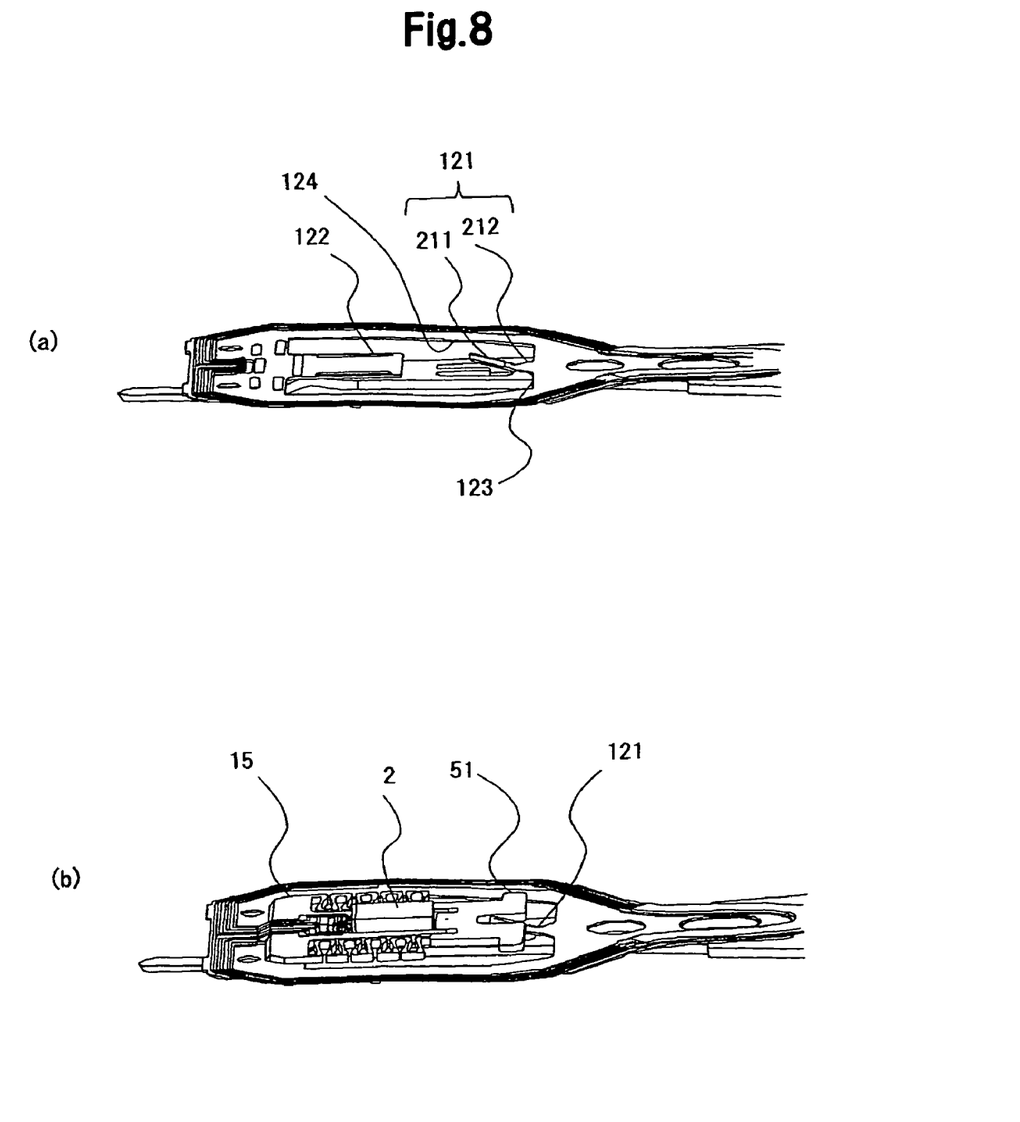
FIGS. 8(a) and 8(b) are perspective views showing limiters for limiting the clamper rotating on a projection as a pivot in an embodiment.

Alternately, as shown in FIGS. 8(*a*) and 8(*b*), the limiter 121 may be formed to extend from the gimbal's body 123, which allows the limiter 121 to be placed without reducing the spacing between the gimbal tongue 122 and the load beam 13. FIG. 8(*a*) is a partial enlarged view of the suspension without the MEMS 15 attached thereto, and FIG. 8(*b*) is a partial enlarged view of an HGA. The limiter 121 protrudes from the opposite side of the gimbal tongue 122 toward the gimbal tongue 122 within an opening 124 where the gimbal tongue 122 is placed.

The limiter 121 extends forward continuously from the gimbal's body 123 and bends toward the MEMS 15 in the middle. Similar to the example of FIG. 7, the limiter 121 may have a soft member 211 made of resin for example at the tip to reduce the impact when the clamper 51 hits the limiter 121. The main body 212 of the limiter 121 is integrated with the body 123 and they are made simultaneously.

Figure 9:
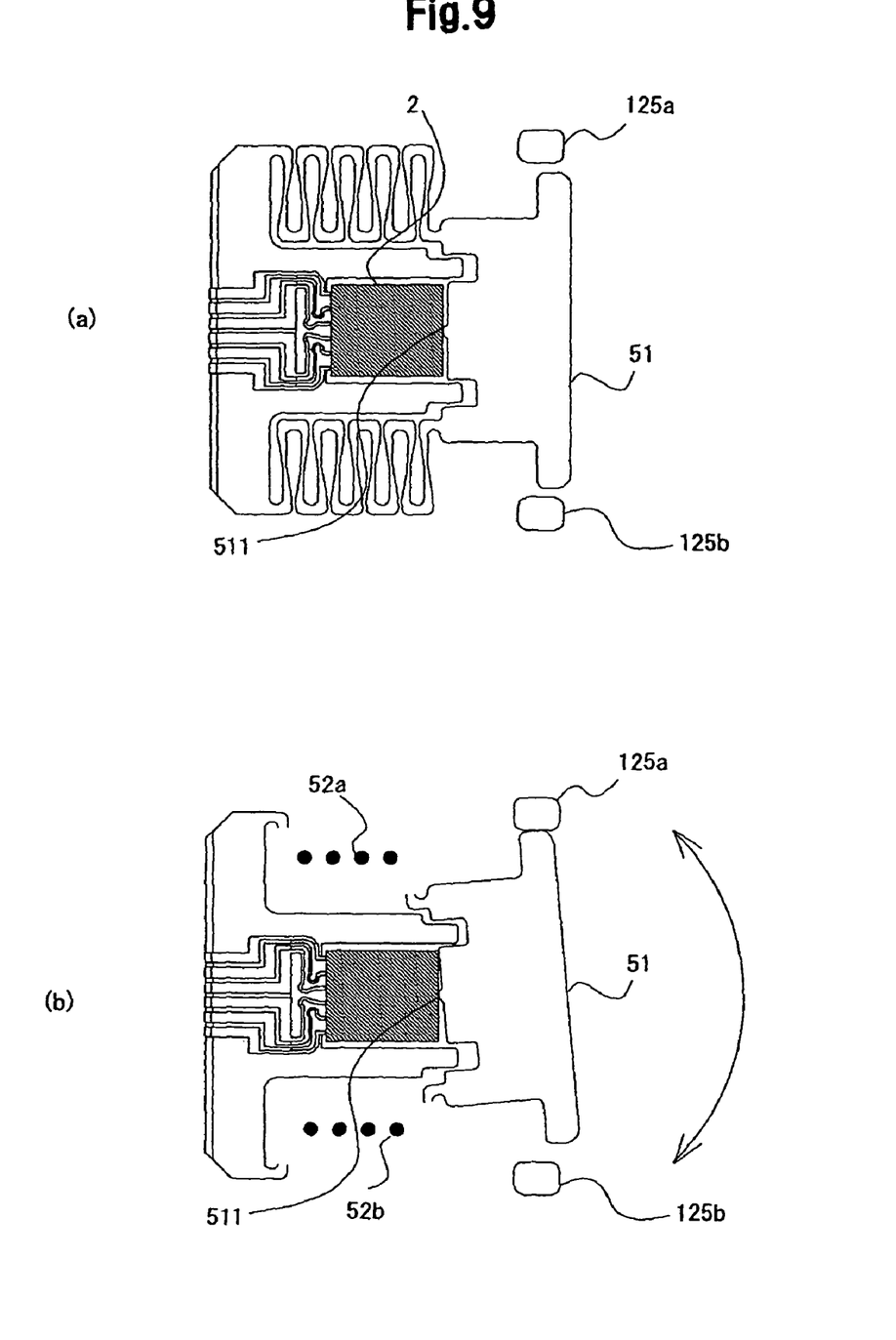
FIGS. 9(a) and 9(b) are drawings showing another example of limiters for limiting the clamper rotating on a projection as a pivot in an embodiment.

FIGS. 9(*a*) and 9(*b*) show another example of limiters. The suspension 1 of the present example has limiters 125*a* and 125*b* on both of the left and right sides of the MEMS 15. The limiters 125*a* and 125*b* are formed on the gimbal 12 and limit displacement of the clamper 51 at positions distant from the projection 511 of the clamper 51.

When the clamper 51 rotates on the projection 511 as a pivot, the clamper 51 hits either one of the limiters 125*a* and 125*b* depending on the direction of the rotation to lock the rotating clamper 51. The limiters 125*a* and 125*b* are located symmetrically on both of the left and the right sides of the clamper 51 and the movable range of the clamper 51 is the same in the left and the right. In the example of the drawing, the limiters 125*a* and 125*b* contact the projections formed on the both sides at the rear end of the clamper 51, respectively. Since the limiters 125*a* and 125*b* can be placed at positions distant from the clamper 51, the required size accuracy in processing and assembling may be reduced.

Figure 10:
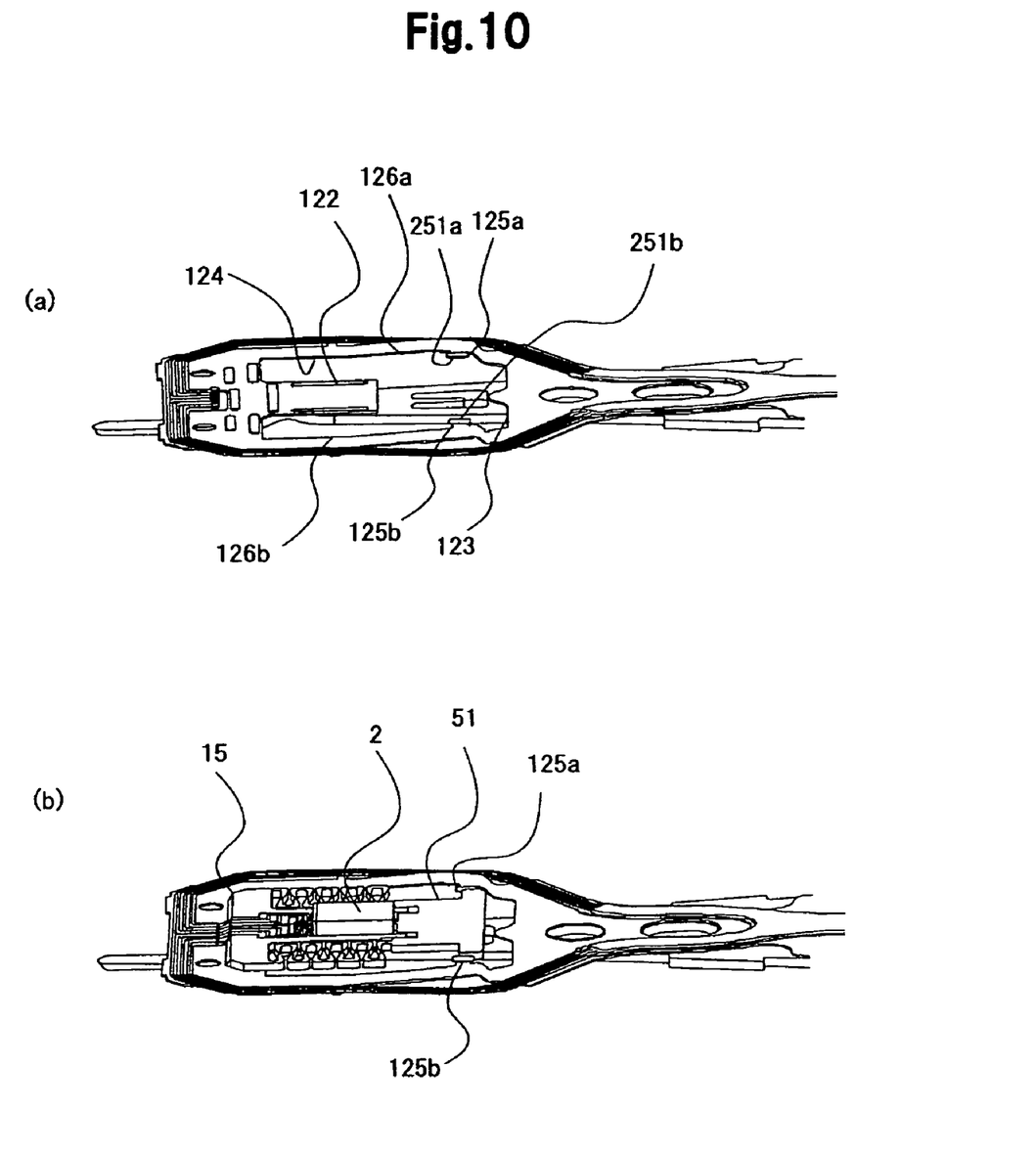
FIGS. 10(a) and 10(b) are perspective views showing another example of limiters for limiting the clamper rotating on a projection as a pivot in an embodiment.

As shown in FIGS. 10(*a*) and 10(*b*), the limiters 125*a* and 125*b* may be formed on the arms 126*a* and 126*b* of the gimbal 12. FIG. 10(*a*) is a partial enlarged view of a suspension 1 without an MEMS 15 attached thereto and FIG. 10(*b*) is a partial enlarged view of an HGA. The gimbal 12 has arms 126*a* and 126*b* defining an opening 124 for placing a gimbal tongue 122 at positions distant from the both of the left and the right sides of the gimbal tongue 122. The arms 126*a* and 126*b* extend forward from the body 123, support the gimbal tongue 122, and enable free movement of the gimbal tongue 122.

The limiters 125*a* and 125*b* protrude from the arms 126*a* and 126*b* toward the inside of the opening 124 and their shapes and the sizes are the same. The limiters 125*a* and 125*b* are integral with and extend from the arms 126*a* and 126*b*, and may have soft resin members 251*a* and 251*b* made of polyimide for example at their tips. These reduce the impact when the clamper 51 hits the limiters 125*a* and 125*b*. The main bodies of the limiters 125*a* and 125*b* are integrated with the arms 126*a* and 126*b* (gimbal 12) and they are made simultaneously.

As set forth above, the present invention has been described by way of particular embodiments but is not limited to the above embodiments. A person skilled in the art could modify, add, or convert the components in the above embodiments within the scope of the substance of the present invention. Embodiments of the present invention are particularly useful in MEMSs and HGAs having clamp springs on both of the left and right sides of the head sliders, but may be applied to MEMSs and HGAs with other clamp spring structures. The shape of the clamp spring is not limited to the above-described shape.

As set forth above, the clamper may have a projection to contact the head slider and that the number of projections be two or less for accurate support, but embodiments of the present invention are not limited to these. If the projection is one, however, the clamper's limiter of embodiments of the present invention can especially exert remarkable effect. The limiter for limiting the clamper's movement may be formed on only the MEMS, only the gimbal, or both of these. The limiters formed on the both can exert remarkable effect. The number of the limiters formed on the MEMS is not limited to two as in the above example.

In the above example, the head slider is secured in an opening of the MEMS, but the MEMS may be provided with a tongue for mounting the head slider thereon. However, it is necessary to produce a flat tongue by processing silicon in manufacturing the MEMS. If there are asperities or foreign particles attached in the process step on the head slider mount surface of the tongue, the head slider is difficult to maintain its proper posture. Therefore, a through hole may be formed in the MEMS and the head slider be mounted on the gimbal supporting the MEMS through the through hole to be held within the through hole.

The same structure as the above-described MEMS may be made in the gimbal. Namely, a plurality of connection terminals, a clamper, and cramp springs may be formed in the gimbal and a head slider is attached to or detached from the gimbal tongue. In particular, the above-described structure of the plurality of connection terminals and the clamper is applicable to form a structure in which a head slider is attached to or detached from a gimbal.

What is claimed is:

1. A micro electro mechanical system to which a head slider is detachably attached, comprising:
   a connection terminal configured to contact a connection pad of a head slider;
   a clamper configured to press the head slider toward the connection terminal;
   two clamp springs that each connect to the clamper to generate a clamping force, wherein the two clamp springs are disposed on opposing sides of the head slider, and wherein the two clamp springs are aligned perpendicular to the clamping force; and
   a limiter configured to contact the clamper to limit movement of the clamper in both directions vertical to the clamping force in plane.

2. The micro electro mechanical system according to claim 1, wherein the limiter further limits the movement of the clamper toward the connection terminal.

3. The micro electro mechanical system according to claim 1, wherein:
the limiter extends from the connection terminal side toward the clamper; a part of a tip of the limiter is positioned in a recess formed in the clamper; and the part of the tip contacts an inner wall of the recess to limit the movement of the clamper.

4. The micro electro mechanical system according to claim 1, wherein: the micro electro mechanical system comprises two limiters; each of the two limiters extends toward the clamper between each of the two clamp springs and the head slider; a part of a tip of each of the two limiters is positioned in a recess formed in the clamper; and the part of the tip contacts an inner wall of the recess to limit the movement of the clamper.

5. The micro electro mechanical system according to claim 1, wherein the micro electro mechanical system comprises a plurality of connection terminals for contacting connection pads of the head slider; a part of the plurality of connection terminals function as stoppers for holding the head slider between the part of the plurality of connection terminals and the clamper; and the other connection terminals of the plurality of connection terminals have smaller spring constants in the clamping force direction than the connection terminals functioning as stoppers.

6. The micro electro mechanical system according to claim 5, wherein the clamper comprises a projection for contacting and pressing the head slider; and the projection is positioned between two connection terminals functioning as the stoppers in the direction where the plurality of connection terminals are arranged.

7. The micro electro mechanical system according to claim 1, wherein the connection terminal has elasticity in the clamping force direction and elasticity in the vertical directions; and the spring constants in the vertical directions are smaller than the spring constant in the clamping force direction.

8. The micro electro mechanical system according to claim 1, wherein the contact position of the clamper to the head slider is farther from an air bearing surface of the head slider than the contact position of the connection terminal to the head slider.

9. A head gimbal assembly comprising:
a suspension;
and a head slider held by the suspension, wherein the suspension comprises:
a gimbal;
a micro electro mechanical system secured to the gimbal, to which a head slider is attached detachably, comprising a connection terminal for contacting a connection pad of the head slider, a clamper for pressing the head slider toward the connection terminal, and two clamp springs that each connect to the clamper to generate a clamping force, wherein the two clamp springs are disposed on opposing sides of the head slider, and wherein the two clamp springs are aligned perpendicular to the clamping force; and
a limiter for contacting the clamper to limit movement of the damper in both directions vertical to the clamping force in plane.

10. The head gimbal assembly according to claim 9, wherein the limiter is formed in the micro electro mechanical system.

11. The head gimbal assembly according to claim 9, wherein the limiter is formed in the gimbal.

12. The head gimbal assembly according to claim 9, wherein the head gimbal assembly comprises: a first limiter formed in the micro electro mechanical system for limiting movement of the clamper in the both directions vertical to the clamping force in plane; and a second limiter formed in the gimbal for limiting movement of the clamper in the both directions vertical to the clamping force in plane.

13. The head gimbal assembly according to claim 11, wherein the limiter protrudes from a gimbal tongue to which the micro electro mechanical system is secured.

14. The head gimbal assembly according to claim 11, wherein the limiter protrudes from a body of the gimbal distant from a gimbal tongue to which the micro electro mechanical system is secured.

15. The head gimbal assembly according to claim 11, wherein limiters for limiting the movement of the clamper are provided on the both sides of the clamper in the directions vertical to the clamping force.

16. A head gimbal assembly comprising:
a suspension; and
a head slider held by the suspension, wherein the suspension comprises:
a plurality of connection terminals configured to contact a plurality of connection pads of the head slider,
a clamper configured to press the head slider toward the connection terminals, and
two clamp springs that are each connect to the clamper to generate a clamping force, wherein the two clamp springs are disposed on opposing sides of the head slider, and wherein the two clamp springs are aligned perpendicular to the clamping force,
wherein a part of the plurality of connection terminals function as stoppers for holding the head slider between the part of the plurality of connection terminals and the clamper; and the other connection terminals of the plurality of connection terminals have smaller spring constants in the clamping force direction than the connection terminals functioning as stoppers.

17. The head gimbal assembly according to claim 16, wherein the clamper comprises a projection for contacting and pressing the head slider; and the projection is positioned between the two connection terminals functioning as stoppers in the direction where the plurality of connection terminals are arranged.

18. The head gimbal assembly according to claim 16, wherein the other connection terminals have elasticity in the clamping force direction and elasticity in the directions vertical to the clamping force in the plane; and the spring constants in the vertical directions are smaller than the spring constant in the clamping force direction.

19. The head gimbal assembly according to claim 16, wherein the contact position of the clamper to the head slider is farther from an air bearing surface of the head slider than the contact position of the connection terminals functioning as stoppers to the head slider.

20. The micro electro mechanical system according to claim 1, wherein the limiter extends from the connection terminal side toward the clamper, wherein a part of a tip of the limiter is positioned in a recess formed in the clamper; and wherein the mouth of the recess within the clamper is formed on a side of the clamper nearest the head slider.

* * * * *